(12) United States Patent
Krippendorf

(10) Patent No.: US 10,704,578 B2
(45) Date of Patent: Jul. 7, 2020

(54) FASTENING DEVICE

(71) Applicant: GOTTLIEB BINDER GMBH & CO. KG, Holzgerlingen (DE)

(72) Inventor: Joerg Siegfried Krippendorf, Kirchhundem (DE)

(73) Assignee: GOTTLIEB BINDER GMBH & CO. KG, Holzgerlingen (DE)

( * ) Notice: Subject to any disclaimer, the term of this patent is extended or adjusted under 35 U.S.C. 154(b) by 0 days.

(21) Appl. No.: 16/317,873

(22) PCT Filed: Jun. 29, 2017

(86) PCT No.: PCT/EP2017/000781
§ 371 (c)(1),
(2) Date: Jan. 15, 2019

(87) PCT Pub. No.: WO2018/028809
PCT Pub. Date: Feb. 15, 2018

(65) Prior Publication Data
US 2019/0234441 A1 Aug. 1, 2019

(30) Foreign Application Priority Data

Aug. 6, 2016 (DE) .................... 10 2016 009 614

(51) Int. Cl.
*F16B 5/00* (2006.01)
*F16B 5/07* (2006.01)
(Continued)

(52) U.S. Cl.
CPC .............. *F16B 5/07* (2013.01); *E04F 13/088* (2013.01); *E04F 13/0816* (2013.01);
(Continued)

(58) Field of Classification Search
CPC ...... F16B 5/07; F16B 13/124; F16B 12/2063; F16B 37/045
(Continued)

(56) References Cited

U.S. PATENT DOCUMENTS 4,192,205 A * 3/1980 Dorosh .................. B25B 27/18
81/53.2
5,384,939 A 1/1995 Weber
(Continued)

FOREIGN PATENT DOCUMENTS

DE 696 33 832 11/2005
DE 10 2013 009 091 12/2014
(Continued)

OTHER PUBLICATIONS

International Search Report (ISR) dated Sep. 27, 2017 in International (PCT) Application No. PCT/EP2017/000781.

*Primary Examiner* — Steven M Marsh
(74) *Attorney, Agent, or Firm* — Wenderoth, Lind & Ponack, L.L.P.

(57) ABSTRACT

A fastening device, in particular, is part of a fastening system for detachably fixing components (42,44) to one another, such as wall coverings to walls, preferably in the field of interiors. The fastening device has a support part (2) including a support plate (12) with protruding closure elements (24) on one side and a protruding fixing part (4) with a fixing structure (26) on the other, opposite side (8). The fixing part (4) has an axial length preferably less than or equal to each radial length of the support part (2) extending transversely to it. The fixing structure (26) of the fixing part (4) is self-locking or self-tapping. The support plate (12) has a cut-out (36) for applying an operating tool. The cut-out extends from the support plate (12) into the fixing part (4) and is free by the closure elements (24).

15 Claims, 2 Drawing Sheets

(51) Int. Cl.
*E04F 13/08* (2006.01)
*F16B 25/00* (2006.01)
*F16B 1/00* (2006.01)
*F16B 11/00* (2006.01)

(52) U.S. Cl.
CPC ...... *E04F 13/0835* (2013.01); *F16B 25/0042* (2013.01); *F16B 11/006* (2013.01); *F16B 2001/0028* (2013.01)

(58) Field of Classification Search
USPC ..................................... 248/466, 475.1, 489
See application file for complete search history.

(56) References Cited

U.S. PATENT DOCUMENTS

| | | | |
|---|---|---|---|
| 5,725,423 A | 3/1998 | Barry et al. | |
| 7,207,543 B2* | 4/2007 | Ortwein | F16B 11/006 248/467 |
| 8,297,571 B2* | 10/2012 | Xue | F16M 11/041 248/220.22 |
| 2008/0078915 A1* | 4/2008 | Haje | A47G 1/1606 248/466 |
| 2013/0125350 A1* | 5/2013 | Poulakis | B60R 13/0206 24/306 |
| 2015/0158437 A1 | 6/2015 | Tuma | |
| 2016/0047132 A1* | 2/2016 | Wessendorf | E04G 5/046 52/27 |
| 2016/0067893 A1 | 3/2016 | Poulakis | |
| 2016/0107353 A1 | 4/2016 | Poulakis | |
| 2019/0263038 A1* | 8/2019 | Poulakis | B29C 45/26 |

FOREIGN PATENT DOCUMENTS

| | | |
|---|---|---|
| DE | 10 2015 001 335 | 8/2016 |
| EP | 2 071 200 | 6/2009 |
| EP | 2 365 156 | 9/2011 |
| WO | 97/06029 | 2/1997 |
| WO | 2013/178339 | 12/2013 |

* cited by examiner

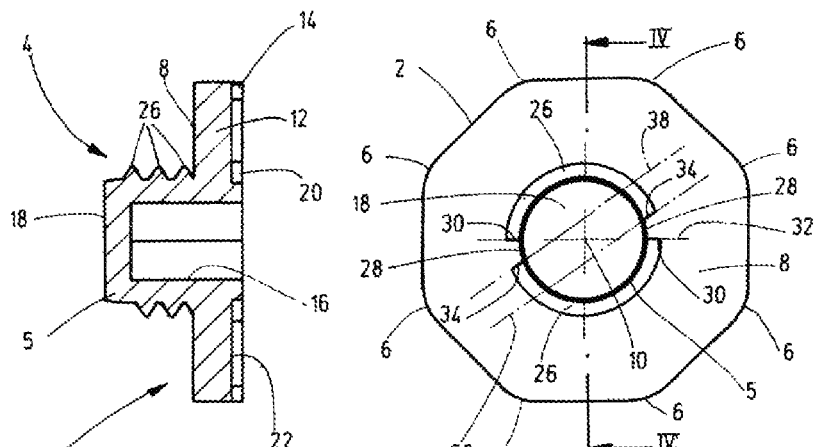
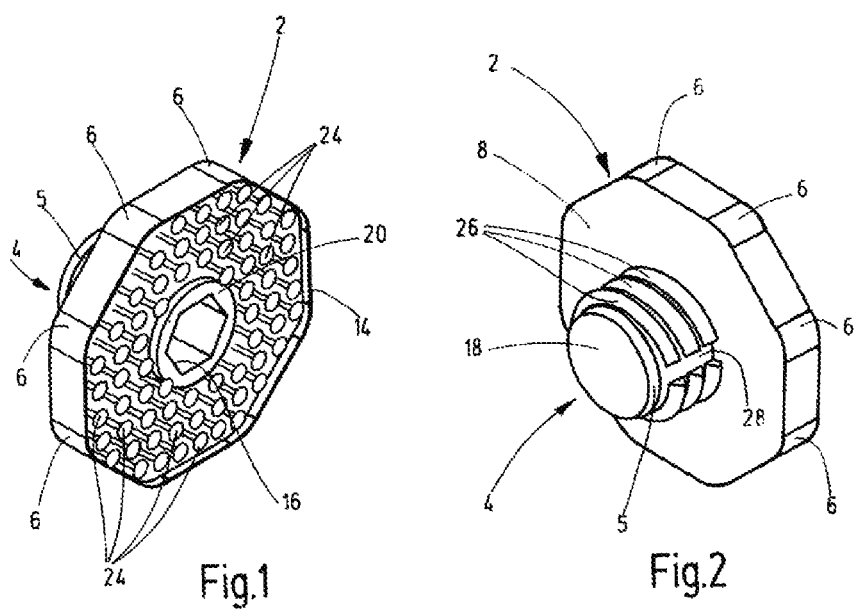

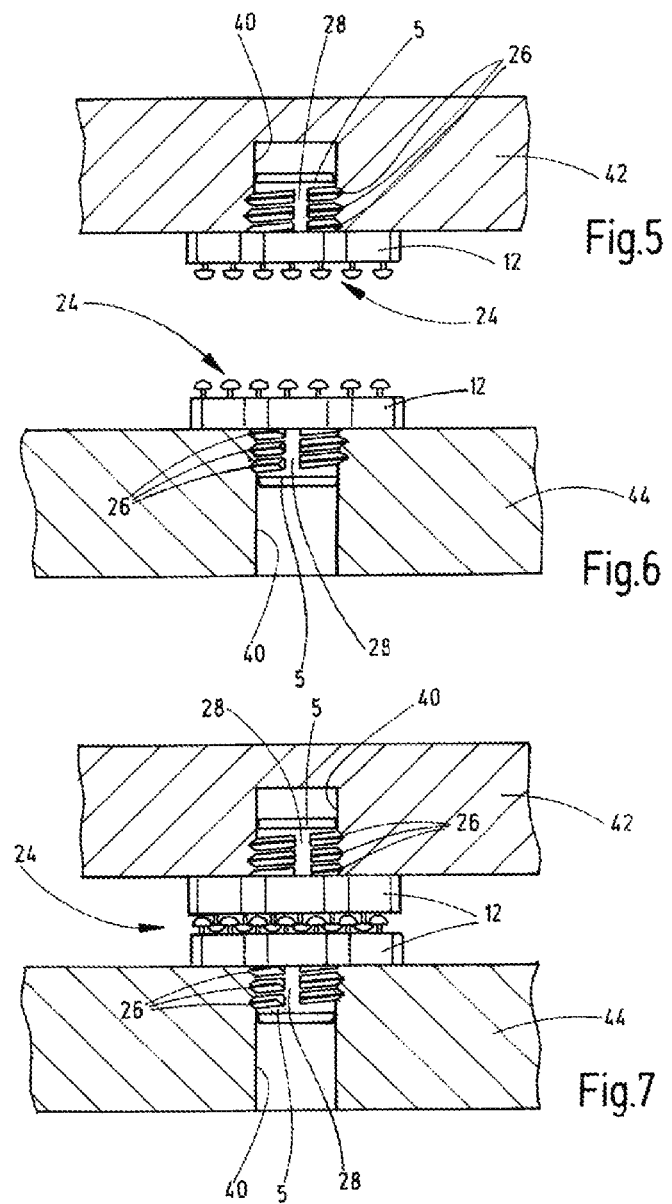

US 10,704,578 B2

FASTENING DEVICE

FIELD OF THE INVENTION

The invention relates to a fastening device, in particular as part of a fastening system for detachably fixing components to one another, such as wall coverings to ceilings and walls, preferably in the area of interior rooms of any kind. The fastening device has a support part including a support plate for protruding adhesive fastener elements on its side and has a prorduding fixing part on its opposite other side, which fixing part has at least one fixing structure.

BACKGROUND OF THE INVENTION

Fastening devices, which, as elements of fastening systems, can be used to attach item s or components to third components by forming adhesive bonds, belong to the prior art in various configurations. For instance, DE 10 2015 001 335 A1 discloses a fastening device of the aforementioned type, which can be used to attach flat elements to ceilings or walls of buildings by forming adhesive bonds. These flat elements can be panels being ceiling or wall coverings, for instance, to conceal ugly-looking spots or to form heat and/or sound insulation. Such fastening devices can also be used to install third components to parts of motor vehicles, railways, ships or aircraft, for example, to attach cover plates or panels to car body parts. Compared to the determination of the components by positively engaging anchors, the formation of adhesive bonds has the advantage that the disassembly can be performed without destruction, for example, for the replacement of components or their removal for maintenance purposes. When fixing by adhesive connections, positional corrections can be performed more easily during the fixing process.

The fastening device disclosed in DE 10 2015 001 335 A1 has a support part and surface-type fasteners protruding from the support part mounted on a support plate, having a handle part protruding above the support plate and having at least one elastically resiliently hooking part. The relevant hooking part extends in an initial position of the handle part and/or a receiving part for the relevant hooking part to form an interstice to the outside, which decreases as soon as the relevant hooking part moves towards the stem or receiving part under the influence of an external force.

The latching part of the relevant support part is in its initial state inserted into a profile opening of a profile channel at least until reaching a final position. The hooking part in its final position can underlap at least one assignable contact surface widening in a groove-shaped manner of the profile opening in the profile channel by turning the support plate located outside the profile opening. Furthermore, the protruding closure elements of the relevant support part can be brought into engagement with correspondingly formed surface-type fasteners of a relevant third component to form a detachable closure.

SUMMARY OF THE INVENTION

Based on this prior art, the invention addresses the problem of providing an improved fastening device of the type mentioned above, which is inexpensive to produce and can be used universally with low installation effort.

According to the invention this problem is basically solved by a fastening device having a fixing part with an axial length that is preferably less than or equal to each radial length of the support member extending transverse thereto. The relevant fixing structure of the fixing part is self-locking or self-cutting. The support plate has a recess for the engagement with an actuating tool, which recess extends from the support plate into the fixing part and is not covered by the surface-type fasteners. In the design of the fixing part having a fixing structure in accordance with the invention, which fixing structure is self-latching or self-tapping without resiliently movable hooks, the fastening device according to the invention can be produced efficiently and particularly inexpensively. No special designs for receiving the fixing part and for the interaction with the fixing structure thereon are required on the surface of the support structure to which the fastening device is to be attached. Instead of a profile channel provided in the known solution, a pre-drilled receptacle is sufficient for the relevant fixing part. The fastening device according to the invention can therefore be universally used with little installation effort, as no special requirements are placed on the particular substrate, such as the feasibility of forming a profile channel. By the recess provided for the engagement of an actuating tool, which recess starts from the support plate and is freely accessible from the front side during the assembly process, the assembly process is particularly simple and convenient.

With particular advantage, the support part having the fixing part and the respective fixing means may be integrally formed from a plastic injection molded part, preferably made of glass fiber reinforced polyamide, such as PA6.

The surface-type fasteners provided for the formation of the closure may be wholly or partly formed of hoops, loops, hooks, mushrooms or stems with thickenings arranged on the end or at the head. For the formation of a self-engaging mushroom fastener, the known Duotec® surface-type fasteners can be used with particular advantage.

As a self-tapping component, the relevant fixing structure may be formed of at least one thread, which is guided around the pin-shaped fixing part and which preferably extends from the support plate to the free end or a free end area of the fixing part. In this form of the fixing structure as a self-tapping screw, the assembly process can be performed particularly simply and conveniently by a turning tool, which engages in the recess provided in the support plate for this purpose.

In particularly advantageous exemplary embodiments, the respective thread, viewed in the longitudinal direction of the pin-shaped fixing part, is interrupted forming at least one receiving groove, preferably a group of several receiving grooves. The grooves form in superposition longitudinal channels in parallel to the longitudinal direction of the fixing part. Preferably at least two such longitudinal channels are particularly preferably arranged diametrically opposite to the longitudinal axis of the fixing part and only pass through the associated thread.

For a plastic support part having a fixing structure formed by a self-tapping screw, for two longitudinal channels opposite to each other, viewed in the circumferential direction, one end of each of the threads can each define a side wall located on a common radial center transverse axis of the support part of the relevant longitudinal channel. The other ends of the threads, which are located on different, radial transverse axes offset from the center, can define the other side wall of the relevant longitudinal channel having a course outwardly expanding the width of the longitudinal channel. This geometry permits a relaxation in the radial direction of tension towards the center of the multi-thread profile. In the manner of known self-tapping screws, this relaxation forms a thread lock against loosening.

To obtain at least one self-engaging fixing structure on the fixing part, at least the flanks of the relevant thread can be designed elastically such that the fastening device can be inserted as a whole into the assignable component in a latching manner in the manner of a push-in plug.

The tool recess provided in the support plate can enable a rotating and/or pressing engagement of the actuating tool. The recess for a rotary tool is preferably designed as a hexagon socket recess.

In advantageous exemplary embodiments, the support part is designed as a polygonal, preferably hexagonal or octagonal support plate, on which the surface-type fasteners can be fixed, in particular adhesively bonded and grouped together as a structural unit on one side. In the case of surface-type fasteners having a support of weldable plastic material, the connection to the support plate can also be formed by welding.

The subject matter of the invention is also a fastening system, which has at least one fastening device according to the invention and of at least one further fastening device having surface-type fasteners that forms a detachable adhesive fastener with the surface-type fasteners of a fastening device and can be connected to another component, which is different from the component having the one fastening device.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure:

FIG. 1 is a perspective view of a fastening device according to an exemplary embodiment of the invention, viewed towards the front provided with a surface-type fastener;

FIG. 2 is a perspective view of the exemplary embodiment, viewed towards the rear having a fixing part;

FIG. 3 is a plan view of the rear of the fastening device of FIG. 1;

FIG. 4 is a side view in section of the exemplary embodiment taken along section line IV-IV of FIG. 3, wherein the surface-type fasteners at the front have been omitted;

FIG. 5 is a side view in section of a surface of the support structure to which the exemplary embodiment of the fastening device according to the invention is mounted;

FIG. 6 is a side view in section of a third component to which a further fastening device according to the exemplary embodiment of the invention is attached for its attachment to the surface surface of the structure of FIG. 5; and FIG. 7 is a side view in section of the fastening system in which the surface of the support structure and the third component are attached to each other by the fastening devices according to the invention.

DETAILED DESCRIPTION OF THE INVENTION

FIGS. 1 to 4 show the exemplary embodiment of the fastening device according to the invention in relation to a practical embodiment, in each case in a view magnified approximately 2.5 times. The exemplary embodiment is an integral structure having a support part 2 and a fixing part 4 located at the rear of the support plate, and is manufactured by injection molding of plastic. In the exemplary embodiment, the fastening device is molded of a glass fiber reinforced polyamide, such as PA6. Further preferred materials are:

high quality glass filled polyamide 66 (PA GF)
polyphtalamide glass filled (PPA GF)
polyetherimide glass filled (PEI GF)
polyphenylene sulfide glass filled (PPS GF)
polyether ether ketone glass filled (PEEK GF)

The support part 2 has, as shown in FIGS. 1 to 3, an outline in the form of an octahedron with rounded corners 6. On the planar back 8 of the support part 2, the fixing part 4 is formed coaxially with the center 10 (FIG. 3) in the shape of a protruding round pin 5. As shown in FIG. 4, the axial length of the protruding pin 5 is less than ⅓ of the radially measured width of the support member 2. At the opposite front side, the support member 2 forms a planar support plate 12, which is bordered along its outer periphery by a rim rib 14 protruding from the plane of the support plate 12. The height of the edge rib 14 is about one quarter of the thickness of the support plate 12.

As shown in FIGS. 1 and 4, a recess 16 extends into the pin 5 of the fixing part 4, starting from the front of the support plate 12. The recess 16 is closed by an end wall 18 just in front of the free end of the pin 5. As a receptacle for the engagement of a rotary tool, the recess 16 has the shape of a hexagon socket, for the size of a practical embodiment mentioned for a width across flat of 6 mm. As shown in FIGS. 1 and 4, the entrance of the recess 16 is surrounded by an enclosure in the form of an annular rib 20 having a circular outer periphery. The height of the annular rib 20 protruding from the plane of the support plate 12 corresponds to the height of the peripheral rim rib 14. The annular surface 22 (FIG. 4) located between outer rim rib 14 and inner annular rib 20 forms the contact surface for the abutment of a blank that appropriately fills the annular surface 22 and that has protruding surface-type or touch-and-close fasteners 24 (only partially numbered in FIG. 1). In the present example, the surface-type fasteners 24 for forming self-engaging mushroom fasteners are formed by mushroom heads on stems protruding from a support. For this purpose, a blank of the known Duotec® material can be provided, which blank is attached to the annular surface 22 of the support plate 12 as a blank self-adhesive. Other types of fastener elements can be provided, for example, having hooking elements in the form of hoops, loops and hooks. Instead of an adhesive connection of the blank to the support plate 12, a welded connection may also be provided.

In the present exemplary embodiment, the pin 5 forming the fixing part is designed as a self-tapping screw, whose threads 26, of which three threads 26 are visible in FIGS. 2 and 4, form the fixing structure. On two opposite sides, the threads 26 are interrupted such that in each case an axially extending longitudinal channel 28 is formed, cf. in particular FIGS. 2 and 3. As FIG. 3 shows, one end 30 of each of the threads 26 defines a side wall of the relevant longitudinal channel 28 located on a common radial center transverse axis 32 of the support part 4. The relevant other ends 34 of the threads 26, which are located on different radial transverse axes 36 and 38, offset from the center, define the other side wall of the longitudinal channel 28, which has a course outwardly expanding the width of the longitudinal channel 28. In the manner known from self-tapping plastic screws, this geometry permits relaxation in the radial direction of tension to the center around the screw profile, which prevents the screw from loosening under dynamic loads.

Instead of the threads 26 having a thread pitch, which, by turning the support part 2 forms a self-tapping screw connection in a pre-drilled receptacle 40, cf. FIGS. 5 to 7, the fixing structure may be formed on the outside of the pin 5 of the fixing part 4 in a self-engaging manner. For this purpose, threads 26 may be formed with or without thread pitch on their flanks in an elastically yielding manner, such that the anchoring to the component or supporting surface can be performed by pressing without rotational movement in the receptacle 40.

FIGS. 5 to 7 show, in a highly schematically simplified form, the example of a fastening system formed by the fastening devices according to the invention. In FIGS. 5 and 7, a component is formed by a building structure 42, in which receptacles 40, predrilled for respective fastening devices according to the invention, are formed in the form of a blind hole, only one of which is shown. A third component to be attached to the component 42, for example, is in the form of a panel 44 in FIGS. 6 and 7. Panel 44 has pre-drilled receptacles 40 in the form of through holes for any fastening devices according to the invention, of which also only one is shown. While FIGS. 5 and 6 show the component 42 and the third component 44 in the unmounted position, FIG. 7 illustrates the fixed state with self-tapping threaded engagement of the pin 5 of the respective fastening device with the associated receptacle 40 in the component 42 and in the third component 44.

The claimed fastening device can also be produced integrally, i.e. together with the surface-type fasteners, by a conventional 3D printing process. In this way, the manufacturing method for the fastening device according to the invention can be further automated.

While one embodiment has been chosen to illustrate the invention, it will be understood by those skilled in the art that various changes and modifications can be made therein without departing from the scope of the invention as defined in the claims.

The invention claimed is:

1. A fastening device as part of a fastening system for detachably fixing components to one another, the fastening device comprising:
    a support part including a support plate having opposite first and second sides;
    a plurality of touch-and-close fasteners fixed on said first side of said support plate;
    a pin-shaped fixing part protruding on said second side of support plate, said fixing part having an axial length along a longitudinal axis thereof less than or equal to each radial length of said support part transverse to said longitudinal axis, said fixing part being self-locking or self-tapping and having threads extending about said fixing part from said second side of said support plate to a free end of said fixing part; and
    a tool recess in said support plate being capable of engagement with an actuating tool, and extending through said support plate and into said fixing part, said tool recess being free of said touch-and-close fasteners.

2. A fastening device according to claim 1 wherein said support part, said fixing part and said threads are integrally formed as a plastic injection molded part.

3. A fastening device according to claim 1 wherein said touch-and-close fasteners comprise at least one of hoops, loops, hooks, mushrooms or stems with thickenings at ends or heads thereof.

4. A fastening device according to claim 1 wherein said threads are interrupted by a groove extending parallel to said longitudinal axis of said fixing part.

5. A fastening device according to claim 1 wherein said threads are interrupted by plural grooves extending parallel to said longitudinal axis of said fixing part.

6. A fastening device according to claim 1 wherein said threads are interrupted by two channels extending parallel to said longitudinal axis of said fixing part, diametrically opposite one another and extending only through said threads.

7. A fastening device according to claim 6 wherein a first end of each of said threads defines a first side wall viewed in a circumferential direction and located on a first common radial center transverse axis of said fixing part defining the respective channel; and
a second end of each of said threads defines a second side wall viewed in a circumferential direction, each said second side wall being located on a different transverse axis offset from said longitudinal axis of said fixing part, defining the respective channel and expanding a width of the respective channel in a radially outward direction relative to said longitudinal axis.

8. A fastening device according to claim 4 wherein said threads have elastic flanks capable of being inserted as a whole in a component as a push-in plug for connection to the component.

9. A fastening device according to claim 1 wherein said tool recess enabling rotating or pressing engagement with the actuating tool.

10. A fastening device according to claim 1 wherein said tool recess is hexagonal in transverse cross section.

11. A fastening device according to claim 1 wherein said support plate is polygonal.

12. A fastening device according to claim 1 wherein said support plate is hexagonal or octagonal.

13. A fastening device according to claim 1 wherein said touch-and-close fasteners extend from a support member adhesively bonded to said support plate.

14. A fastening device according to claim 1 wherein said tool recess is closed at an inner end thereof remote from said support plate.

15. A fastening system for detachably fixing components to one another, the fastening system comprising:
    first and second fastening devices, each of said fastening devices having
        a support part including a support plate having opposite first and second sides;
        a plurality of touch-and-close fasteners fixed on said first side of said support plate;
        a protruding pin-shaped fixing part on said second side of support plate, said fixing part having an axial length along a longitudinal axis thereof less than or equal to each radial length of said support part transverse to said longitudinal axis, said fixing part being self-locking or self-tapping and having threads extending about said fixing part from said second side of said support plate to a free end of said fixing part; and
        a tool recess in said support plate being capable of engagement with an actuating tool, and extending through said support plate and into said fixing part, said tool recess being free of said touch-and-close fasteners.

* * * * *